United States Patent [19]
Bals et al.

[11] Patent Number: 5,540,793
[45] Date of Patent: Jul. 30, 1996

[54] POROUS PRILLED AMMONIUM NITRATE

[75] Inventors: Edwin Bals; Jacobus Breedt, both of Sasolburg; William L. Spiteri, Pretoria; Adriaan J. Goosen, Randburg, all of South Africa

[73] Assignee: Sasol Chemical Industries (Proprietary) Limited, Johannesburg, South Africa

[21] Appl. No.: 321,551

[22] Filed: Oct. 12, 1994

[30] Foreign Application Priority Data

Oct. 15, 1993 [ZA] South Africa .......................... 93/7682
Oct. 15, 1993 [ZA] South Africa .......................... 93/7683
Apr. 13, 1994 [ZA] South Africa .......................... 94/2533

[51] Int. Cl.$^6$ .................................................. C06B 45/00
[52] U.S. Cl. .................................. 149/2; 149/17; 149/14; 71/61; 423/396; 23/295 R
[58] Field of Search .................................. 149/2, 17, 46; 71/61; 423/396; 23/295 R

[56] References Cited

U.S. PATENT DOCUMENTS 4,889,570  12/1989  Leong .......................................... 149/7

*Primary Examiner*—Donald P. Walsh
*Assistant Examiner*—Anthony R. Chi
*Attorney, Agent, or Firm*—Victor E. Libert; Frederick A. Spaeth

[57] ABSTRACT

A porous prilled product, particularly ammonium nitrate, and its method of preparation, which includes encapsulated microspheres, particularly polymer microballoons, which serve to reduce the density of the product.

The invention also extends to an explosives composition particularly ANFO and heavy ANFO, including such ammonium nitrate of reduced density.

38 Claims, 2 Drawing Sheets

POROUS PRILLED AMMONIUM NITRATE

FIELD OF THE INVENTION

This invention relates to a porous prilled product, particularly porous prilled ammonium nitrate.

In this specification the term 'porous prilled' is used to refer to a particulate product which, in the case of ammonium nitrate, contains less than 0.5%, preferably less than 0.2%, water on a mass per mass basis.

DESCRIPTION OF RELATED ART

Porous prilled ammonium nitrate is commonly employed as one of the components of explosive compositions used in the mining industry.

Thus, for example, porous prilled ammonium nitrate is mixed with fuel oil to form the explosive composition known as ANFO, and with an emulsion to form heavy ANFO, with or without the prior addition of fuel.

For reasons of cost efficiency, and/or in order to control the total explosive power of a particular charge; a low density ammonium nitrate prill is often preferred and various methods have been devised for producing such a product. In general such methods relate to the prilling of less concentrated solutions of ammonium nitrate.

Apart from the fact that the aforesaid known methods have limits of practicality, they also place a heavy burden on available drying equipment. Also, the resulting prills, although having the desired higher porosity and hence lower density, are usually of relatively low mechanical strength, often to the extent where they are useless in practical application.

It is accordingly an object of this invention to provide a porous prilled product, particularly ammonium nitrate, of reduced density and its method of preparation, with which the aforesaid problems can be overcome or at least minimised. A further object is to provide an explosive composition including such a prilled ammonium nitrate of reduced density.

SUMMARY OF THE INVENTION

According to the invention a porous prilled product is provided which includes encapsulated microspheres.

Applicant has found that the presence of such microspheres reduces the density of the product substantially.

Further according to the invention the product comprises ammonium nitrate and as the microspheres any one or more of the following: polymer balloons; glass balloons; metal hollow spheres; natural porous products such as Perlite, or cenospheres such as fly ash floaters, or the like.

Preferably the microspheres have the following physical properties in the final product:

| | |
|---|---|
| Size | 5–1500 micro meter |
| Density range | 0,015–0,39 gram per cm$^3$ |
| Temperature stability | Stable at process temperatures of 130–170° C. for a sufficient time to effect prilling during the prilling process |
| Breaking strength | Able to withstand at least 100 kg/cm$^2$ force or, able to regain its shape after impact deformation. |

DETAILED DESCRIPTION OF THE INVENTION

Figure 1:
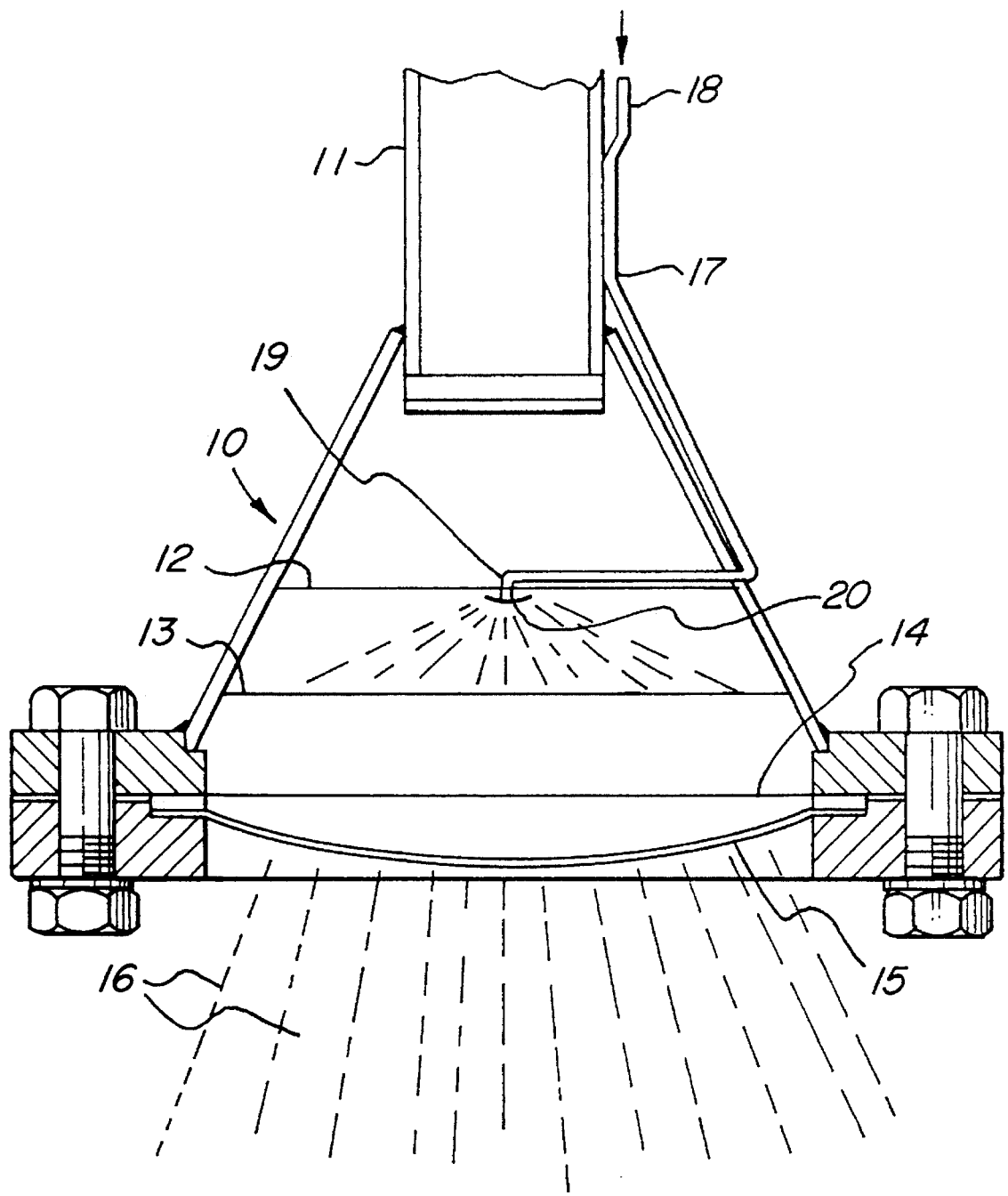
FIG. 1 is a diagrammatic longitudinal section view of an apparatus comprising a prilling nozzle usable for the prilling of ammonium nitrate.
Figure 2:
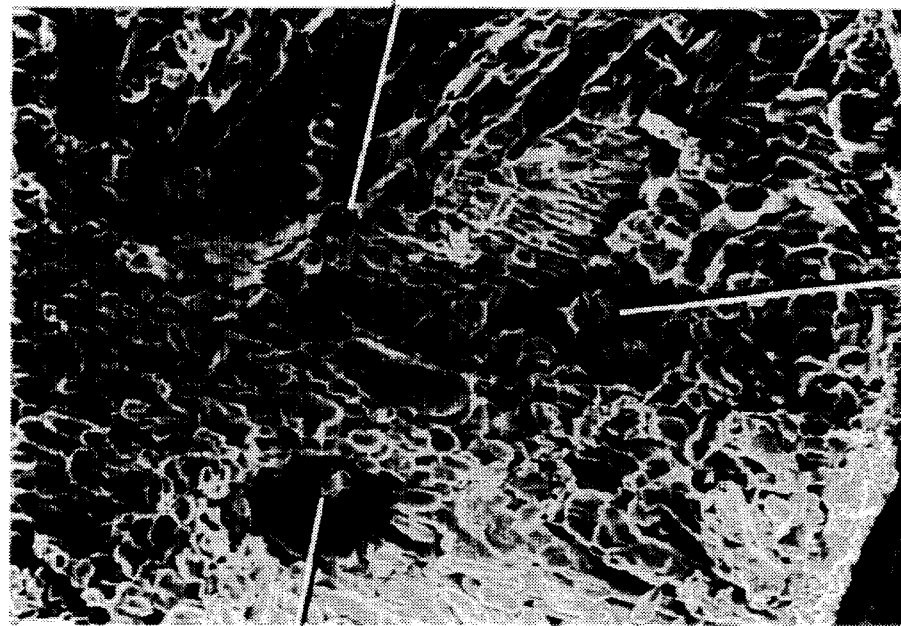
FIG. 2 shows two electron microscope photographs, photograph No. 1, which is at a magnification 2 ½ times greater than that of photograph No. 2, showing conventional porous prilled ammonium nitrate ("PPAN") and photograph No. 2 showing PPAN made in accordance with an embodiment of the present invention.
Figure 2:
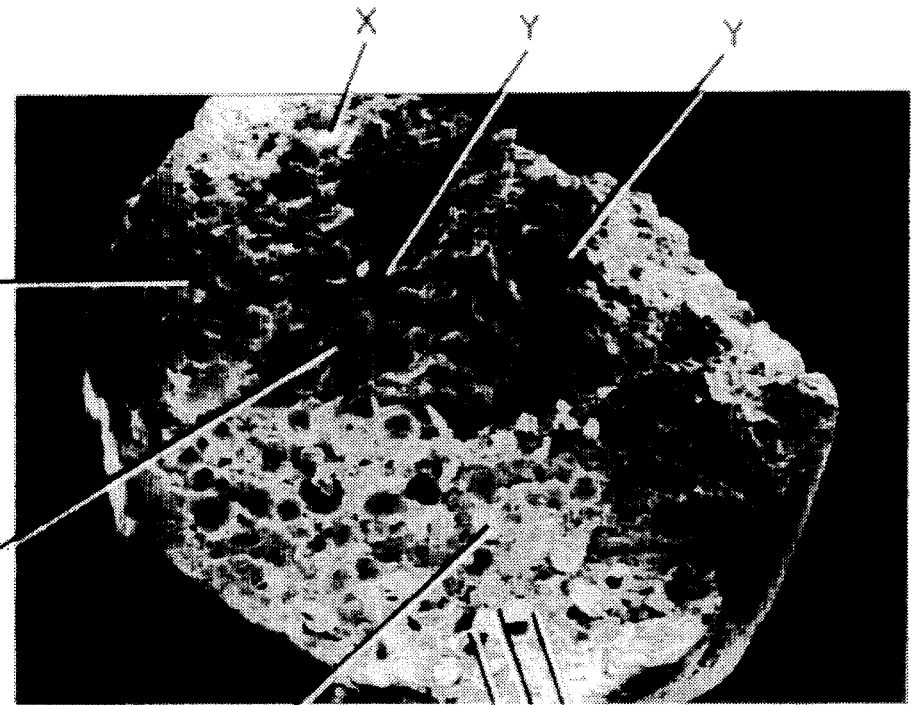

It will be appreciated that when the microspheres comprise polymer balloons, they are so chosen that they will expand to the sizes specified above during the prilling of the amonium nitrate.

Preferably the microspheres comprise polymer microballoons of which the size in the prilled product is between 2.0 and 150 micro meter.

Applicant has found the product known as Expancel 910 extremely useful in this regard although the scope of the invention is not intended to be restricted to such a compound.

Preferably the microspheres are present in the ammonium nitrate in a concentration (mass/mass) of between 0.05 and 10.0%, more preferably 0.05 and 0.8% in the case of polymer microballoons.

Further according to the invention the porous prilled product also includes limestone.

In a preferred form of the invention the porous prilled product may include from 70.0% to 99.9% mass per mass of amonium nitrate containing encapsulated microspheres as disclosed above and from 30.0% to 0.1% mass per mass limestone.

Still further according to the invention the porosity of the product can further be enchanced by the inclusion of gas in the product during the prilling process.

Applicant has found that the passages created in such a prilled product by the inclusion of gas can improve the porosity of such product without unduly effecting its mechanical strength.

Further according to the invention the gas is developed in situ in the product via a suitable chemical reaction.

Still further according to the invention the gas comprises carbon dioxide which is formed through the decomposition of a suitable carbonate in acid medium.

The carbonate may comprise any suitable water soluble inorganic salt of carbonic acid, such as, for example, potassium and/or sodium carbonate or, alternatively, it may comprise a less soluble salt.

Where the porous prilled product comprises ammonium nitrate, it invariably contains some acidity which reacts with the added carbonate to yield the required carbon dioxide.

Preferably the carbonate comprises potassium carbonate which is present in a concentration of between 0.01 to 1.00% mass/mass.

Applicant has found that the potassium nitrate which is formed in the reaction between the added potassium carbonate and nitric acid present in ammonium nitrate acts as a crystal habit modifier for the ammonium nitrate, thus imparting increased mechanical strength to the ammonium nitrate and increasing the transition temperature (32 degrees C.) of the crystal transition between the II crystal form and the III crystal form.

Still further according to the invention the prilled product may include colloidal silica which serves to harden the surface of the product.

Further according to the invention the colloidal silica is provided by adding to the unprilled product silicilic acid and/or poly silicilic acid and/or waterglass in a sufficient concentration, preferably between 0.1 and 10% mass/mass, to ensure an acceptable friability and breaking strength.

The invention also includes within its scope an explosive composition, particularly ANFO and/or heavy ANFO, including such a prilled ammonium nitrate product of which the density had been reduced due to the presence of encapsulated microspheres.

Applicant has found that, apart from obtaining a lowered density in the resulting prill, with or without the addition of gas producing carbonate and with or without the addition of colloidal silica, the lower density is also retained after pneumatic loading of an ANFO-type explosive formed from the porous prill and fuel oil in the 94:6 ratio normally used for such an explosive.

According to another aspect of the invention a method for reducing the density of a porous prilled product includes the step of adding encapsulated microspheres to the product during the prilling of the product.

Preferably the product comprises ammonium nitrate and the microspheres are at least one of the types referred to above.

Further according to this aspect of the invention the microspheres are added at a point during the prilling process where the liquid product is divided into droplets.

Where polymer microspheres are used, this procedure serves to minimise the time that such spheres can be affected by the high temperatures.

Where other types of micropheres are used, it serves to reduce the time during which such spheres are subjected to any aqueous acidic product which may be present.

Such points of addition may comprise:

(a) in the centre of a conventional type of prilling bucket
(b) at the stem of a nozzle prilling unit (shower head type)
(c) at the point of injection in the case of pan granulated material.

Further according to the invention the method includes the step of adding to the unprilled product a carbonate and/or colloidal silica at any convenient point in the process before the prilling takes place, the gas generation from the carbonate preferably taking place in the droplet before solidification in such a way that the gas bubbles are small and uniform and that the gas evolvement is not too fast.

Thus, for example, where a conventional type of prilling nozzle or rotating bucket is used for the prilling operation, the carbonate can be introduced by means of an atomising nozzle located inside such apparatus in a position spaced between its inlet and outlet.

One embodiment of a method according to the invention will now be described by way of example with reference to the enclosed drawing which is a diagrammatic longitudinal section through an apparatus suitable for carrying out the method.

In this arrangement a conventional type of conically shaped (shower head) prilling nozzle 10 is employed for the prilling of ammonium nitrate. Nozzle 10 has a tubular inlet 11 through which the ammonium nitrate solution to be prilled can be fed onto two spaced apart transversely extending diffuser plates 12 and 13 and to pass from there via a 100 micro meter screen 14 and nozzle plate 15 as ammonium nitrate droplets 16.

Nozzle 10 is also provided with an elongated discharge tube 17 which runs down the side of nozzle 10 and which is bent over its length as indicated. Tube 17, which has its leading end passing through an aperture in nozzle 10 to the inside of nozzle 10, has an inlet 18 and an outlet 19 located inside nozzle 10. Although outlet 19, which is connected to a wide angle spray nozzle 20, is shown as being carried on the underside of diffuser plate 12, it can in fact be located in any place over the length of nozzle 10. Also, if required the diffuser plates 12 and 13 may be omitted.

The microspheres and potassium carbonate solution required in the process are introduced through inlet 18 to pass down tube 17 and via outlet 19 to issue in atomised form from nozzle 20 into the ammonium nitrate spray passing from diffuser plate 12 to diffuser plate 13.

Although the silica colloid required in the process can be added to the bulk nitrate solution before prilling, the preferred method is to make a solution of the silica colloid and to add this solution either on its own or in conjunction with the carbonate solution to the prilling nozzle 10 via inlet 11. This late addition in the prilling process prevents gelling of the silica colloid and blockages in process equipment.

Table 1 reflects some of the properties found with a product according to the invention.

TABLE 1

| Microspheres Mass % Added | Prill Density g/cm$^3$ | Breaking Strength[1] Kg | Friability (%)[2] | Density After[3] Loading g/cm$^3$ |
|---|---|---|---|---|
| 0 (Standard) | 0.760 | 1.1 | 2.4 | 1.05 |
| 0.11 | 0.676 | 0.88 | 2.1 | 1.01 |
| 0.22 | 0.610 | 0.66 | 0.80 | 0.96 |
| 0.25 | 0.603 | 0.61 | 0.64 | 0.88 |
| 0.31 | 0.545 | 0.54 | 1.0 | 0.92 |

Notes:
[1]This is the load in kilograms required to break a prill.
[2]This represents the resistance of the prills to abrasion caused by an air steam and is expressed as the percentage of prill breakages caused by the resulting abrasion forces.
[3]This expresses the increased density of the prills when an explosive composition containing the prills is pneumatically loaded into a bore hole.

The microstructure of conventional PPAN and PPAN prepared according to the invention are respectively shown in the enclosed copies of two electron microscope photographs Nos 1 and 2, the encapsulated microspheres in the latter being marked 'X'. The enlargement of photograph No 1 is 2½ times that of photograph No 2.

Both photographs show the presence of natural voids marked 'Y', which of course tend to disappear on pneumatic loading of the product.

The product according to the invention can be used in conventional manner to manufacture a typical 94:6 ANFO—type explosive composition.

Table 2 reflects the detonation results obtained with such a composition.

TABLE 2

| Product | Detonator Strength[1] | Critical Diameter[2] | VOD[3,4,5] | VOD in 210 mm Diameter[6] |
|---|---|---|---|---|
| Standard PPAN | 8D | 22 mm | 3400–3600 m/sec | 4300 m/sec |

TABLE 2-continued

| Product | Detonator Strength[1] | Critical Diameter[2] | VOD[3,4,5] | VOD in 210 mm Diameter[6] |
|---|---|---|---|---|
| Modified PPAN[7] | 6D | 12.7 mm | 3000–3900 m/sec | 4100 m/sec |

Notes:
[1]The numbers relate to the smallest numbered detonator which initiates the ANFO. The detonators used contain the following explosives (approximate quantities):

| NUMBER | PETN MAIN CHARGE | INITIATING EXPLOSIVE MIX |
|---|---|---|
| 6D | 400 mg | 100 mg |
| 8D | 800 mg | 100 mg |

The sensitivities were measured in 26 mm confined charges, which were pneumatically loaded, using the equipment and operating conditions customary in South African gold and platinum mines in narrow reef stopping and tunneling.
[2]Critical diameter is defined by Meyer, in "Explosives", first edition, from Verlag Chemie as the minimum diameter of an explosive charge at which detonation can still take place. The critical diameter was measured for confined charges which were pneumatically loaded.
[3]Velocity of Detonation (VOD) is defined by the same source as for No 1 as the rate of propagation of a detonation in an explosive. It is expressed in units of length per unit time, e.g. meters per second.
[4]The stated VODs are for 26 mm diameter confined charges, the charge being pneumatically loaded.
[5]The range in VOD values is obtained with various loaded densities which are, again, dependent on the pressure in the pneumatic loading device during the loading process.
[6]VOD of charges poured into 210 mm diameter drill holes in broken sandstone.
[7]The modified PPAN is an ammonium nitrate prill containing 0.26% (mass %) EXPANCEL 910 microballoons.

It will be noted from Table 2 that the velocity of detonation of the composition according to the invention is generally lower than that of the standard. Also, the critical diameter of the product is smaller while the sensitivity to initiation is higher than that of the standard, under charging conditions used during evaluation.

Sensitivity to mechanical handling was tested by methods in accordance with those recommended by the United Nations, relating to the Transportation of Dangerous Goods, and the product according to the invention was found to be comparable with the standard.

Applicant has found that a safe and highly efficient low cost ANFO explosive is provided according to the invention which shows enhanced sensitivity to initiation and consistent detonation velocities over a wide range of blast hole diameters and pneumatic loading pressures.

Also, in the case of heavy ANFO, the low effective particle density of the product according to the invention offers an advantage over the known systems. This is so because the performance of heavy ANFO systems is vitally dependent upon the sensitivity of the blend when exposed to static and dynamic pressures.

It will be appreciated that there are no doubt many variations in detail possible with a novel product and method according to the invention without departing from the spirit and/or scope of the appended claims.

We claim:

1. A porous prilled product in the form of particles which includes encapsulated microspheres ingrained within the particles.

2. The porous prilled product of claim 1 which comprises ammonium nitrate, and the microspheres are at least one of the following: polymer balloons; glass balloons; metal hollow spheres; natural porous products such as Perlite; cenospheres such as fly ash floaters, or the like.

3. The porous prilled product of claim 1 wherein the microspheres have the following physical properties in the prilled product:

| | |
|---|---|
| Size | 5–1500 micro meter |
| Density range | 0,015–0,39 gram per cm$^3$ |
| Temperature stability | Stable at process temperatures of 130–170° C. for a sufficient time to effect prilling during the prilling process |
| Breaking strength | Able to withstand at least 100 kg/cm$^2$ force or, able to regain its shape after impact deformation. |

4. The porous prilled product of claim 1 wherein the microspheres comprise polymer microballoons which had expanded during the prilling process to a size between 2 and 150 micro meter.

5. The porous prilled product of claim 1 wherein the microspheres comprise the product known as Expancel 910.

6. The porous prilled product of claim 1 wherein the microspheres are present in a concentration (mass/mass) of between 0.05 and 10.0%.

7. The porous prilled product of claim 1 wherein the microspheres comprise polymer microballoons in a concentration of between 0.05 and 0.8% mass/mass.

8. The porous prilled product of claim 1 which includes limestone.

9. The porous prilled product of claim 8 wherein the concentration of the limestone is between 0.1 and 30% mass per mass.

10. The porous prilled product of claim 1 of which the porosity had been enhanced by the inclusion of gas in the product during the prilling of the product.

11. The porous prilled product of claim 10 wherein the gas is developed in situ in the product via a chemical reaction.

12. The porous prilled product of claim 10 wherein the gas comprises carbon dioxide which is formed through the decomposition of a suitable carbonate in acid medium.

13. The porous prilled product of claim 12 wherein the carbonate comprises a water soluble inorganic salt of carbonic acid, including potassium and sodium carbonate.

14. The porous prilled product of claim 12 wherein the carbonate comprises potassium carbonate which is present in a concentration of between 0.01 and 1.00% mass/mass.

15. The porous prilled product of claim 1 which includes colloidal silica which upon drying during the prilling of the product migrates with the water in the prills to the surface to harden the latter and so improve the mechanical strength of the product.

16. The porous prilled product of claim 15 wherein the colloidal silica is present in a concentration of between 0.1 and 10% mass/mass.

17. A method for reducing the density of a porous prilled product including the step of adding encapsulated microspheres to the product during the prilling of the product.

18. The method of claim 17 wherein the porous prilled product comprises ammonium nitrate.

19. The method of claim 17 wherein the microspheres comprise at least one of the following: polymer balloons; glass balloons; metal hollow spheres; natural porous products such as Perlite; cenospheres such as fly ash floaters, or the like.

20. The method of claim 17 wherein the microspheres have the following physical properties in the prilled product:

| | |
|---|---|
| Size | 5–1500 micro meter |
| Density range | 0,015–0,39 gram per cm$^3$ |
| Temperature stability | Stable at process temperatures of 130–170° C. for a sufficient time to effect prilling during the prilling process |
| Breaking strength | Able to withstand at least 100 kg/cm$^2$ force or, able to regain its shape after impact deformation. |

21. The method of claim 17 wherein the microspheres comprise polymer microballoons which had expanded during the prilling process to a size between 2 and 150 micro meter.

22. The method of claim 17 wherein the microspheres comprise the product known as Expancel 910.

23. The method of claim 17 wherein the microspheres are present in a concentration (mass/mass) of between 0.05 and 10.0%.

24. The method of claim 17 wherein the microspheres comprise polymer microballoons which are present in a concentration of between 0.05 and 0.8% (mass per mass).

25. The method of claim 17 including the step of including gas in the product during the prilling of the product.

26. The method of claim 25 wherein the gas is developed in situ in the product via a chemical reaction.

27. The method of claim 25 wherein the gas comprises carbon dioxide which is formed through the decomposition of a suitable carbonate in acid medium.

28. The method of claim 27 wherein the carbonate comprises a water soluble inorganic salt of carbonic acid including potassium and sodium carbonate.

29. The method of claim 27 wherein the carbonate comprises potassium carbonate which is present in a concentration of between 0.01 and 1.00% mass/mass.

30. The method of claim 17 including the step of adding colloidal silica to the product prior to its prilling, which colloidal silica upon drying during the prilling of the product migrates with the water in the prills to the surface to harden the latter and so improve the mechanical strength of the product.

31. The method of claim 30 wherein the colloidal silica is provided by adding at least one of silicilic acid or waterglass to the unprilled product in a sufficient concentration between 0.1 and 10% mass/mass to ensure an acceptable friability and breaking strength.

32. The method of claim 17 wherein the microspheres are added at that point in the prilling process where the liquid product is divided into droplets.

33. The method of claim 32 wherein the point of addition comprises one of the following:

(a) in the centre of a prilling bucket (b) at the stem of a nozzle prilling unit (shower head type)

(c) at the stem of an injection, in the case of pan granulated material.

34. The method of claim 30, wherein the carbonate and colloidal silica are added at any point in the prilling process before the prilling actually takes place, so that the gas generation from the carbonate takes place in the droplet before solidification in such a way that the gas bubbles are small and uniform and that the gas evolvement is not too fast.

35. The method of claim 27 wherein a conventional type of prilling nozzle is used for the prilling operation and the carbonate is introduced by means of an atomising nozzle located inside the nozzle between its inlet and outlet.

36. A blasting composition including particles of a porous prilled ammonium nitrate containing encapsulated microspheres ingrained within the particles.

37. The blasting composition of claim 36 comprising one of ANFO or heavy ANFO.

38. The porous prilled product of claim 1 which comprises ammonium nitrate, and the microspheres are selected from the group consisting of at least one of natural porous products and cenospheres.

\* \* \* \* \*